Patented Nov. 3, 1953

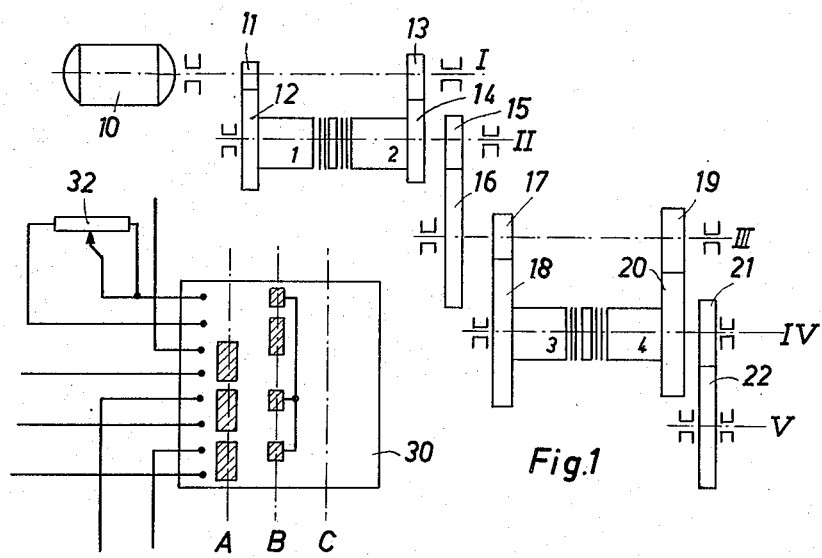
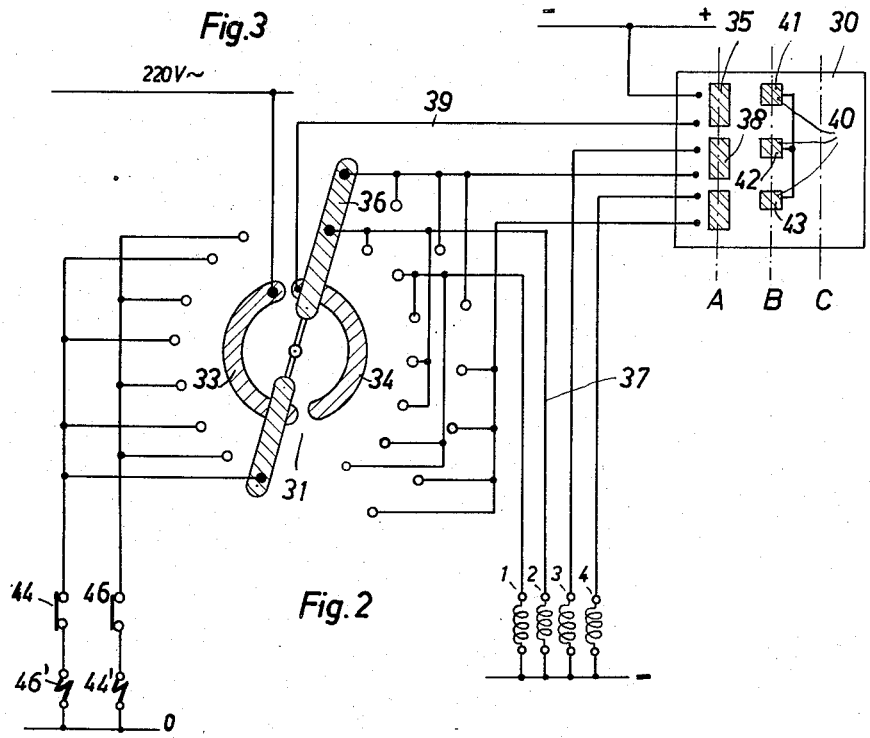

2,657,587

UNITED STATES PATENT OFFICE 2,657,587

SPEED CONTROLLABLE DRIVE WITH ELECTROMAGNETIC GEAR COUPLINGS

Paul Volk, Erlangen, and Hans Spiesecke, Frankfurt am Main, Germany, assignors to Siemens-Schuckertwerke Aktiengesellschaft, Berlin-Siemensstadt, Germany, a corporation of Germany Application April 6, 1951, Serial No. 219,614

6 Claims. (Cl. 74—472)

Our invention relates to speed controllable drives with transmission gears controllable by electromagnetic couplings.

The increasingly exacting requirements for a far-going subdivision of the speed range of electrically driven machines, in particular machine tools, have led to the development of geared drives whose various speeds are set electrically as well as mechanically by means of a selector switch. An especially favorable solution resulted from the combination of a pole-switchable plural-speed motor with a change-speed transmission gearing controlled by electromagnetic gear couplings. This makes it possible to provide a single switch, preferably of the rotary type, for switching the pole number and hence the speed of the motor, as well as the particular magnet couplings needed for each desired speed setting. The speed adjustment of the driven machine is thus greatly simplified and the change from one speed to another is very rapidly executed so that this kind of control is especially suitable for frequently reversing machines such as turret lathes, for instance.

A speed control scheme alone, however, does not satisfy the demands on controllability. Another requirement often to be met is to rapidly brake the machine down to stand still, for instance, in order to manually revolve the chuck or another part of the machine. Such a quick stopping operation is feasible only when the disconnection of the drive is accompanied by a far-going reduction in the mechanical resistances to motion.

It seems possible, in principle, to also assign the control functions for the braking, releasing and the like additionally required performances to the above-mentioned speed selector switch. This, however, would not only burden the switch with a number of additional switch positions that in may cases can be accommodated only with difficulty, but would also create the hazard that the operator, especially when quick switching operations are called for, may fail to land on the right position and may set the switch to a position damaging to the work piece and tool.

It is, therefore, an object of our invention to provide a control for a switchable-pole motor with an electromagnetically controlled speed-change transmission gearing, that affords a simplification of the circuit and apparatus designs as well as an easy and reliable attendance.

Another, ancillary object of our invention is to provide such drive and control apparatus with simple and reliable braking means capable of quickly stopping the driven machine without requiring braking means in addition to the gear and coupling means of the speed-change gearing.

Still another object of the invention is to secure minimized mechanical resistance to motion of the drive output shaft when the quick-acting braking means are set in operation.

According to our invention, we provide a pole-switchable electric motor and the electromagnetic couplings of a speed-change transmission gear with a common selector switch for mutually correlated selective operation, and we connect the coupling controlling circuit of the selector switch with a generally series arranged master switch whose selective adjustable setting determines the desired kind of operation. The master switch has a "run" position in which the drive will operate under speed control by the selector switch, a "brake" position in which the drive is adjusted for braking performance regardless of the setting of the selector switch; and the master switch may also have additional settings, in particular a "release" position in which the drive output shaft is freed from the drive and may be revolved at minimum mechanical resistance.

According to another feature of the invention, the braking performance controlled by the master switch is effected by magnetic gear coupling means. In general, it is not necessary to provide a drive according to the invention with a separate braking coupling but suffices to utilize for this purpose the electromagnetic gear coupling means ordinarily pertaining to the drive. If there are at least two electromagnetic couplings within one and the same gear step to permit selecting two respectively different transmission ratios, this being almost always the case with modern designs, then a very effective braking can be obtained through this pair of couplings by leaving the previously active gear coupling switched in and actuating the second coupling additionally when rapid braking of the drive is desired. It has been found that this kind of braking secures especially favorable results.

The foregoing and other objects and features of the invention will be apparent from embodiments exemplified on the drawing and described in the following. On the drawing—

Fig. 1 shows schematically a general plan of a drive and speed-change transmission, Fig. 2 shows the appertaining electric circuit including the combination of a speed selector switch with a master switch for controlling the kind of machine operation, and Fig. 3 shows schematically the circuit diagram of a modified connection of the master switch.

According to Fig. 1, a pole-switchable motor 10 is provided for driving an output shaft V. Motor 10 may consist, for instance, of an alternating-current induction motor with two sets of field windings to produce respectively different numbers of field poles. For instance, one winding may be wound to produce six poles when energized and the other winding may be wound to produce four poles, so that the motor will run at different synchronous speeds depending upon which of the two windings is energized.

The transmission gearing between the motor shaft I and the gear output shaft V includes a two-step gearing, each step providing two selective transmission ratios. The shaft II of the first step is equipped with two magnetic couplings 1 and 2; the shaft IV of the second speed step is also equipped with two couplings 3 and 4. The shaft III is an intermediate shaft driven through step-down gears 15, 16. The power path from motor 10 to shaft V thus extends through shaft I, and either the spur gears 11, 12 or the spur gears 13, 14 to shaft II, thence through the gear pair 15, 16 to the shaft III, and from shaft III through either gear pair 17, 18 or gear pair 19, 20 to shaft IV, thence through gear pair 21, 22 to shaft V. Any of the available motor speed and gear ratio combinations can readily be adjusted. For instance, motor 10 may be connected for operation with six poles, while gear pair 11, 12 is placed in operation by energization of the magnetic coupling 1 to drive the gears 15, 16, 17 and 19. If coupling 3 is energized, gear 17 then drives through gear 18 and coupling 3 the shaft IV from which the output shaft V is driven through gears 21 and 22. The just mentioned control adjustment results in the smallest available revolving speed of shaft V. The highest available output speed is obtained when the drive motor 10 is connected for operation with four poles and when the couplings 2 and 4 and hence the gear pairs 13, 14, and 19, 20 are switched in.

For switching the drive to the various output speeds, a speed selector switch 31, designed as a rotary switch, is provided. This switch has two mutually insulated segments 33 and 34 in contact engagement with respective slide contacts of a switch arm that are electrically insulated from each other and engageable with respective banks of contacts. The contacts of the bank pertaining to the segment 33 are connected through contactors 44 and 46 with the two above mentioned field windings 44' and 46' of the motor 10. Consequently, the angular position of the slider 36 determines which of the two field windings is energized at a time, and hence at which base speed the motor 10 will run. The bank contacts pertaining to the segment 34 are connected with the energizing windings of the four electromagnetic couplings 1, 2, 3, 4. The connection extends through a master switch 30, which is designed as a drum switch and shown in developed form. The master switch 30 has a "run" position denoted by A, a "brake" position denoted by B, and a "release" position denoted by C. Assume that the master switch 30 is placed on "run" position A and that then the arm 36 of the speed selector switch 31 is in the position shown in the drawing. Then the six-pole motor winding 46' is impressed by alternating voltage through segment 33 of switch 31, while the four-pole winding 44' is disconnected. The motor 10 is then switched to slow-speed operation. The circuit of the magnetic gear coupling means then extends as follows: From the positive bus of a direct-current supply line through contact 35 to segment 34, thence to the upper slide contact of arm 36 from which the current path is branched. One branch passes through a lead 37 to the energizing winding of coupling 2 and to the negative bus of a direct-current supply. The other branch extends through contact 38 and through the energizing winding of coupling 3 to the negative bus. Consequently, when the motor is set for six-pole speed, the couplings 2 and 3 are simultaneously switched in so that the shaft V runs at a definite speed of rotation. When the contact arm 36 is switched to the next position, the motor 10 is switched to four-pole excitation, while nothing is changed as far as the coupling control circuits is concerned. Hence, the couplings 2 and 3 remain switched in so that the revolving speed of shaft V is increased in accordance with the increase in the revolving speed of the drive motor 10 when changing from six to four poles. Assume that the drive is to be stopped. Then the switch 30 is turned from "run" position A to "brake" position B. This places the lead coming from the positive bus in connection with the contacts 40. As a result, two mutually opposing circuit connections are established. The connection through the contact 35 and serving to energize the couplings 2 and 3, is now interrupted since lead 39 is de-energized. Therefore, the couplings 2 and 3 would normally be switched out. However, coupling 3 receives again voltage through contacts 41 and 42, and the contact 43 places also voltage on the coupling 4. Since the transmission step of shaft II is now disconnected, the motor 10 is now mechanically separated from the rest of the drive, while in the transmission step of shaft IV both couplings 3 and 4 are switched in. These two couplings now act as a brake with the result that an extremely rapid yet soft braking performance is achieved.

If it is now desired to place the driven shaft V or, for instance, the chuck of a driven lathe into a definite position such as needed to mount a work piece or the like, the drive is supposed to be completely disconnected from the driven shaft. This is obtained by placing the switch 30 into the "release" position C. In this position all four couplings are de-energized so that the output shaft V can be freely revolved under minimum mechanical resistance.

To secure an especially smooth braking, a resistor 32 may be added in accordance with the partial circuit diagram shown in Fig. 3. The resistor 32 is inactive in the "run" position A of the master switch 30 and is inserted into the circuit only when the switch is turned to the "brake" position B.

It will be apparent to those skilled in the art upon a study of this disclosure that our invention permits of various other modifications as regards details of the circuit connections and circuit components without departing from the essence of the invention and within the scope of the claims annexed hereto.

We claim:

1. A speed-controllable drive, comprising a pole-switchable electric motor of adjustable speed, an output shaft, a speed-change gear transmission connecting said shaft with said motor and having selectively operable electromagnetic coupling means for adjusting the transmission ratio, a multi-position speed control switch having contact means connected with said motor for pole-switching said motor to adjust the motor speed and having contact means connected with said coupling means for adjusting said ratio in a given correlation with the motor speed, and a selective master switch having a "run" position and a "brake" position, said master switch having first contact means and second contact means, said first contact means being series connected with said coupling means and with said control switch and closed in said "run" position to then permit speed selective control of said motor by said control switch, said gear transmission comprising a gear step with two selective speed ratios and said coupling means having two couplings in said gear step selectively actuatable in respective different positions of said control switch, said two couplings being both connected with said second contact means of said master switch and said second contact means being closed in said "brake" position to then simultaneously actuate said two couplings.

2. A speed-controllable drive according to claim 1, comprising electric resistance means connected with said contact means of said master switch and disposed in series connection with at least one of said coupling means only when said master switch is in said "brake" position.

3. A speed-controllable drive, comprising an electric motor, an output shaft, a speed-change gear transmission connecting said motor with said output shaft and having two gear steps each of two selective transmission ratios, said transmission having two selectively actuatable electromagnetic couplings in each of said two gear steps, two electric energizing buses, said coupling being parallel connected to one of said two buses, a multi-position speed control switch having first contact means selectively connecting said couplings with the other bus for adjusting the transmission ratio of said transmission, a master switch having a "run" position and a "brake" position and having second contact means and third contact means closed in said "run" and "brake" position respectively, said second contact means being series interposed between said control switch and said other bus, said third contact means connecting only the two couplings of a coupling pair near said output shaft across said two buses so said motor is uncoupled from said transmission when said master switch is in said brake position.

4. A speed-controllable drive, comprising an electric motor, a speed-change gear transmission connected with said motor and having selectively energizable electromagnetic couplings for adjusting the transmission ratio depending upon which of said couplings are energized at a time, a speed selector switch connected with said couplings for controlling said ratio in accordance with the switch setting, and a master switch selectively adjustable independently of said speed selector switch and having a selective position in which said master switch is connected with said motor and through said speed selector switch with the couplings selected by said speed selector switch, and said master switch having another selective position in which it is connected with predetermined ones of said couplings independently of the setting of said selector switch.

5. A speed-controllable drive, comprising an electric motor, an output shaft, a speed-change gear transmission having a plurality of gear shafts for connecting said motor with said output shaft, said transmission having two electromagnetic couplings for each of said gear shafts for controlling the transmission ratio depending upon which of said two couplings are actuated, a speed selector switch having respective selector contacts connected with said couplings for controlling said ratio in accordance with the setting of said selector switch, electric current supply means and an adjustable master switch having three selective positions, said master switch connecting said speed selector switch and the couplings selected thereby to said current supply means when in one of said positions, said master switch disconnecting said selector switch and couplings from said supply means when in another one of said positions, and said master switch connecting two couplings pertaining to one of said gear shafts with said current supply means when in the third position.

6. A speed-controllable drive, comprising an electric motor, an output shaft, a speed-change gear transmission connecting said motor with said output shaft and having selectively actuable electromagnetic couplings for changing the transmission ratio of said transmission depending upon which of said couplings are actuated, a speed selector switch having respective selector contacts connected with said couplings for controlling said ratio in accordance with the setting of said selector switch, electric current supply means and an adjustable master switch having three selective positions, said master switch connecting said speed selector switch and the couplings selected thereby to said current supply means when in one of said positions, said master switch disconnecting said selector switch and couplings from said supply means when in another one of said positions, and said master switch connecting a predetermined pair of said couplings with said current supply means when in the third position.

PAUL VOLK.
HANS SPIESECKE.

References Cited in the file of this patent

UNITED STATES PATENTS

| Number | Name | Date |
|---|---|---|
| 786,419 | Cutler | Apr. 4, 1905 |
| 844,662 | Cutler | Feb. 19, 1907 |
| 865,997 | Churchward | Sept. 17, 1907 |
| 2,215,627 | Walter | Sept. 24, 1940 |